United States Patent [19]

Rau et al.

[11] Patent Number: 4,907,220
[45] Date of Patent: Mar. 6, 1990

[54] PROCESS FOR THE ESTABLISHMENT OF VIRTUAL CONNECTIONS PASSING THROUGH SWITCHING MATRICES OF A MULTI-STAGE SWITCHING SYSTEM

[75] Inventors: Peter Rau; Andreas Foglar, both of Munich; Herbert Schneider, Emmering, all of Fed. Rep. of Germany

[73] Assignee: Siemens Aktiengesellschaft, Berlin and Munich, Fed. Rep. of Germany

[21] Appl. No.: 312,545

[22] Filed: Feb. 17, 1989

[30] Foreign Application Priority Data

Feb. 19, 1988 [DE] Fed. Rep. of Germany ....... 3805277

[51] Int. Cl.⁴ ................................................ H04J 3/26
[52] U.S. Cl. ..................................... 370/60; 370/94.1
[58] Field of Search ............................. 370/58, 60, 94

[56] References Cited

U.S. PATENT DOCUMENTS 4,218,756  8/1980  Fraser .................................. 364/900
4,491,945  1/1985  Turner .................................. 370/60
4,837,761  6/1989  Isono et al. ......................... 370/60

FOREIGN PATENT DOCUMENTS 8400265  1/1984  PCT Int'l Appl. .

Primary Examiner—Douglas W. Olms
Assistant Examiner—Melvin Marcelo
Attorney, Agent, or Firm—Jeffrey P. Morris

[57] ABSTRACT

For the establishment of virtual connections passing through switching matrices of a multi-stage switching system, it is provided that upon the arrival of a call packet requesting the establishment of a virtual connection, a central control device identifies all the switching matrices involved in the connection to be established and determines setup information that must be assigned to each of them in order to establish the connection. This setup information is fed to the individual switching matrices from the central control device in a setup packet along the path of the virtual connection to be established.

5 Claims, 8 Drawing Sheets

PROCESS FOR THE ESTABLISHMENT OF VIRTUAL CONNECTIONS PASSING THROUGH SWITCHING MATRICES OF A MULTI-STAGE SWITCHING SYSTEM

BACKGROUND OF THE INVENTION

1. Technical Field

The invention relates to a process for the establishment virtual connections passing through switching matrices of a multi-stage switching system.

2. Description of the Prior Art

A process for the establishment of virtual connections of this kind is already known from U.S. Pat. 4,491,945. In this conventional process, a call packet arriving at one of the inputs of the switching system, in which the establishment of a virtual connection is requested, is conducted directly to a switching matrix input which is assigned to the input at which the packet arrives. In this case, the call packet contains as its header a virtual channel number which designates the virtual connection to be established and, in its information part, the destination address for the said connection. On the basis of this destination address, a processor assigned to the switching matrix in question determines the switching matrix output to be used for the establishment of the connection and a virtual channel number that is valid for this output. This virtual channel number is used to transmit the message packets that follow the call packet, through the output that has been determined.

The information described above is stored, under control of the processor, in a memory assigned to the above-mentioned input of the switching matrix. Next, this processor generates a call packet corresponding to the previously received call packet, whose header contains the previously determined virtual channel number and transfers it over the previously defined output to the following switching matrix. In this switching matrix and the switching matrices that follow it, procedures take place that correspond to the procedures explained above, so that ultimately the connection information described above is stored successively in all the switching matrices of the switching system that are to be included in the virtual connection that is to be established.

It is the object of the invention to provide a method using a process of the kind described above to determine, with a minimum of control operations, the connection information that is required for the establishment of a virtual connection and to store it in the individual switching matrices that are involved in that virtual connection.

SUMMARY OF THE INVENTION

This object is achieved accordingly to the invention by using a process in which at one of the inputs of the switching system a call packet is input requesting the establishment of a virtual connection and containing, in addition to a virtual channel number designating the virtual connection, a destination address. A central control device assigned to the switching system then determines the switching matrices to be used for the virtual connection in question. Then the individual information for each of the switching matrices is determined and from the central control device to the switching system a specially indicated setup packet is emitted containing the individual information that has just been determined through the input at which the call packet in question had previously arrived. Further, the setup packet is passed through the switching matrices involved in the virtual connection that is to be established, pursuant to the individual information contained in the setup packet. Each of the switching matrices takes off the individual information intended for it, and the individual information is stored in a respective memory device which individual information gives on the one hand, the output of the respective switching matrix through which the message packets belonging to the respective virtual connection are to be transmitted and, on the other hand contains a virtual channel number which is entered in the message packets belonging to the respective virtual connection for their transmission.

The invention has the advantage that the information required for the establishment of virtual connections is determined centrally and conducted to the individual switching matrices involved in a virtual connection. This reduces the control operations in the individual switching matrices. A further advantage is that the information is transmitted in a setup packet over the path of the connection to be established. This eliminates the need for separate control channels between the central control device and the switching matrices of the switching system.

BRIEF DESCRIPTION OF THE DRAWING

Additional features of the invention and additional objects of the invention will be more readily appreciated and better understood by reference to the following detailed description which should be considered in conjunction with the drawings.

DETAILED DESCRIPTION

Figure 1:
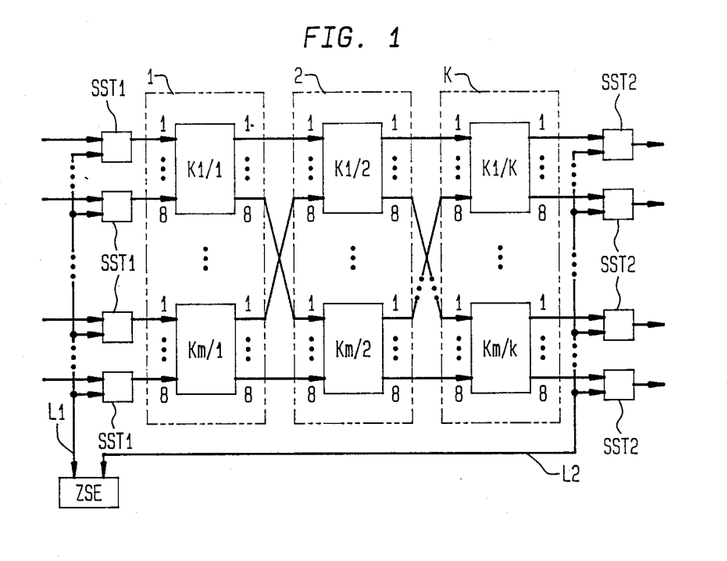
FIG. 1 shows a block circuit diagram of a multi-stage switching the transmission of message packets.

FIG. 1 represents a switching system comprising k switching stages for the transmission of message packets over virtual connections. To each of the k switching stages, there are assigned m switching matrices, which might each have 8 inputs and 8 outputs. Each of the inputs can be connected to each of the outputs. According to their assignment to the individual switching stages, the switching matrices are designated as K1/1 to Km/1, K1/2 to Km/2, ..., K1/k to Km/k. The inputs designated 1 to 8 of the switching matrices K1/1 to Km/1 in this case constitute inputs of the switching system, to which inputs transmission lines are connected through corresponding interface systems SST1. On the other hand, outputs 1 to 8 of the switching matrices K1/k to Km/k constitute outputs of the switching system, to which output transmission lines are connected through corresponding interface systems SST2. In this case, subscriber sets that transmit or receive message packets can be connected to the input or output transmission lines, respectively. These transmission lines, however, can also be connection lines, through which the switching system shown in FIG. 1 is connected to other switching systems.

The interface systems SSTI mentioned above are also connected jointly to a line system L1 of a central control device ZSE. On the other hand, the interface systems SST2 mentioned above are connected to this central control device through a second line system L2.

Figure 2:
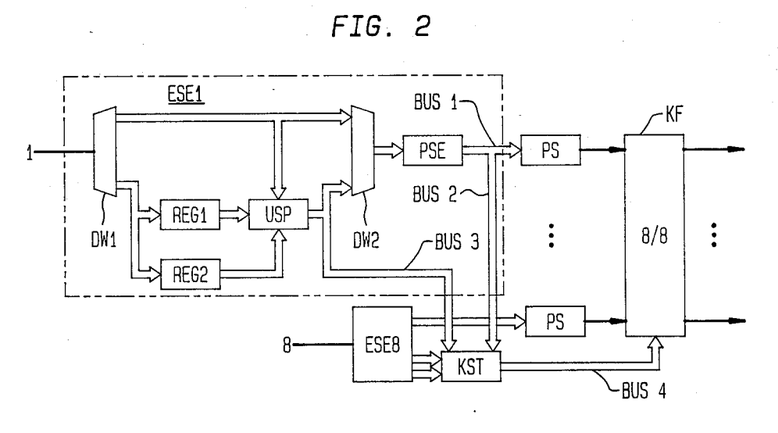
FIG. 2 shows a block diagram of a section of a possible design of the switching matrices that are shown only schematically in FIG. 1.

FIG. 2 represents a section of a possible design for the switching matrices shown in FIG. 1. The drawing includes only those switching parts that are necessary to explain the present invention. A separate input control device is connected to each of the inputs 1 to 8 of the switching matrix represented. Depending on their assignment to the inputs 1 to 8, these devices are designated ESE1 to ESE8. Each of these input control devices is designed in the same manner as the input control device ESE1. Accordingly, each such input control device has on its input side a data selector DW1. This data selector is connected on the input side through a bus system to the corresponding interface system SST1 shown in FIG. 1. This data selector is connected with its first outputs through a bus system to inputs of two registers Reg1 and Reg2. The outputs of the register Reg1 go to control inputs of a memory system USP. On the other hand, the outputs of the register Reg2 are connected to address inputs of this memory system.

The second outputs of the above-mentioned data selector DW1 are, on the one hand, data inputs of the memory system USP and, on the other, the first inputs of a second data selector DW2. The second inputs of this data selector are connected with data outputs of the memory system USP. These data outputs are also connected to a switching matrix control device KST (BUS3).

A packet control device PSE is connected through a bus system downstream to the data selector DW2. The first outputs (BUS1) of this packet control device are connected to inputs of a buffer memory PS, while the second outputs (BUS2) are connected to the above-mentioned switching matrix control device KST. On its output side, the buffer memory is connected to an input of a switching matrix KF, which, according to the example selected here, may have a total of 8 inputs and 8 outputs. This switching matrix is controlled by the above-mentioned switching matrix control device KST, which is connected to it by a bus system (BUS4).

Now that the circuit systems shown in FIGS. 1 and 2 have been described, the process for the establishment of virtual connections according to the present invention, is explained in greater detail with reference to FIG. 3. For this purpose, it is assumed that message packets of a prescribed length are transmitted over the transmission lines connected to the switching system, which packets have, in a packet header, control information and a virtual channel number designating a virtual connection. For this purpose, in each case, 8 bits, that is, 1 octet, are provided. Following this packet header comes the information part of the message packet, in which the telecommunication signals to be transmitted are contained. By telecommunication signals, it may be understood to mean data signals, text information signals and/or voice or image signals coded in binary form.

The situation in which a call packet, in which the establishment of a virtual connection is requested, is received through one of the interface systems SST1 is now considered. This call packet contains a signaling packet header with, for example, a virtual channel number that has been determined for call packets. In the information part, a destination address for the connection to be established is given. This call packet is recognized as such by the interface system SST1 and fed to the central control device ZSE. On the basis of the destination address contained in the call packet, the central control device, which might consist, for example, of a microprocessor system, determines the switching matrices involved in the connection to be established. In addition, it determines for each of these matrices the output to be used and a virtual channel number, which is to be entered in the message packets following the call packet if they are transmitted through the specific output. Next, the central control device ZSE forms a setup packet, which contains the previously determined information for all the specified switching matrices. In this case, the information assigned to the individual switching matrices is entered in the sequence in which the switching matrices are traversed when message packets are transmitted.

Figure 3:
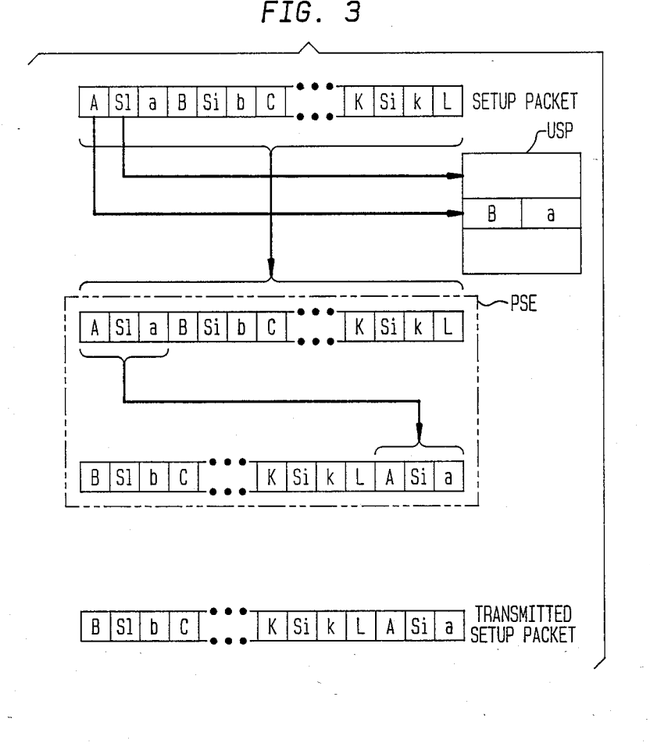
FIGS. 3 to 5 show process diagrams, which will be explained in the course of the of the description.

A first embodiment of the structure of a setup packet is shown in the upper part of FIG. 3. According to it, a pair of octets is provided for each of the switching matrices selected. In the first octet of each pair of octets, there is entered a virtual channel number determined by the central control device. In FIG. 3 these numbers are designated by A, B, . . . , L. The second octet of each pair of octets is a control octet, in which there is entered not only control information but also address information which designates the output to be used for the connection in question in the respective switching matrix. In FIG. 3 the address information is designated by a, b, . . . , k, respectively, and the control information by SI. One of the control bits is used in this case to identify a setup packet. The first of the pairs of octets contained is also the packet header.

Referring again to FIG. 1, the setup packet formed by the device ZSE is fed to the interface system SST from which the call packet had previously been received. From this system, the setup packet is then transmitted to the data selector DW1 (of FIG. 2) of the assigned switching matrix, in which there first takes place a serial-to-parallel conversion of the octets, that is, the individual octets of the setup packet occur in parallel form. In addition, the interface system in question gives to the data selector a control signal indicating the beginning of the setup packet. When this control signal is received, the data selector is set in such a manner that the virtual channel number A (FIG. 3) contained in the first pair of octets of the setup packet is entered in the register Reg2 (FIG. 2), and the control information SI is entered in the register Reg1. In this case the control information has been determined by the central control device ZSE in such a manner that the memory system USP (FIG. 2) is set to a write cycle. For this write cycle, a memory cell assigned to the virtual channel number stored in the register Reg2 is addressed by that number. Then the address information a occurring in the first pair of octets of the setup packet and the virtual channel number B of the following pair of octets are entered in the cell (USP in FIG. 3).

In addition, the setup packet that has just been received is fed by the data selector DW1 to the data selector DW2 of the packet control device PSE. In this packet control device, the address information, as contained in the first pair of octets is read out and transmitted to the switching matrix control device KST. On the basis of this address information, the switching matrix control device then sets the switching matrix KF. However, this setting is known and is not described here in greater detail, because it is not a part of the present invention.

In the above-mentioned packet control device PSE, the setup packet that has just been fed to it is also modified in such a manner that the pair of octets that has, up to then, been the first, is split off, so that what was formerly the second pair of octets, which contains the virtual channel number B, is now the packet header. In this case the pair of octets that has been split off can be added to the end of the modified setup packet, so that the latter still retains its original length (PSE in FIG. 3). However, it is also possible to eliminate the split-off pair of octets, so that an abbreviated setup packet is created.

The modified setup packet is then fed to the buffer memory PS, in which it is stored for the time being until it is transmitted through the switching matrix KP. Then if a transmission is about to occur, the switching matrix KF is set up by the switching matrix control device KST in accordance with the address information that has previously been received. After the switching matrix has been set up in this manner, the setup packet that has been temporarily stored is transmitted to the following switching matrix.

In this following switching matrix and the switching matrices that follow it, process steps corresponding to the process steps described above take place, so that the setup packet ultimately passes through all the switching matrices involved in the connection to be established. After this process has taken place, the information required for a subsequent transmission of message packets has been stored in the switching matrices in question.

The transmission of message packets after a virtual connection has been established will not be discussed here in greater detail. It is merely pointed out that when a message packet is transmitted over the individual switching matrices, the memory systems USP (FIG. 2) contained in the respective switching matrices are set to a read cycle on the basis of the virtual channel number contained in the message packet. In this case, the virtual channel number stored in the cell is read out from the memory cell designated by this virtual channel number. The data selector DW2 writes this virtual channel number over the virtual channel number that has up to then been contained in the message packet. After this writing, the message packet is then fed to the buffer memory PS. In the read cycle just described, the address information stored in the memory cell in question is also read out and fed to the switching matrix control device KST in order to set up the switching matrix KF.

Below there are given some further methods for transmitting setup packets in accordance with the invention.

In a second method (FIG. 4) for the transmission of a setup packet, there is transmitted from the central control device ZSE a setup packet whose header (first pair of octets) contains a virtual channel number to be used for activating the first switching matrix and control information for the identification of a setup packet. In the subsequent pairs of octets (information part of the setup packet), there are entered, for each of the individual switching matrices, address information designating the output to be used and the virtual channel number that is applicable to this output.

Figure 4:
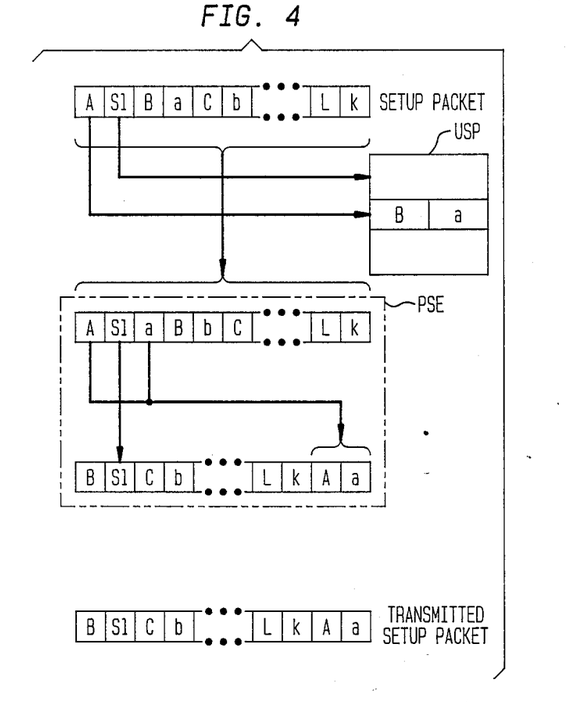

When this setup packet passes through the switching matrices, the respective memory systems USP (FIG. 2) are activated by the virtual channel number entered in the packet header, and the information contained in the pair of octets following the packet header is stored. For the transmission of this setup packet to the next switching matrix, the packet header of the setup packet that has been received is removed in the packet control device PSE. In the process, the control information contained in the packet header is entered in the pair of octets that formerly followed the packet header, with the address information contained in it being overwritten. This address information has previously been stored, and is not needed in the following switching matrix.

This second method which has just been explained is particularly well suited for switching systems with a great many stages, because, in the setup packet described above, information for a greater number of switching matrices can be transmitted, while retaining the same packet lengths, than with the first method.

Figure 5:
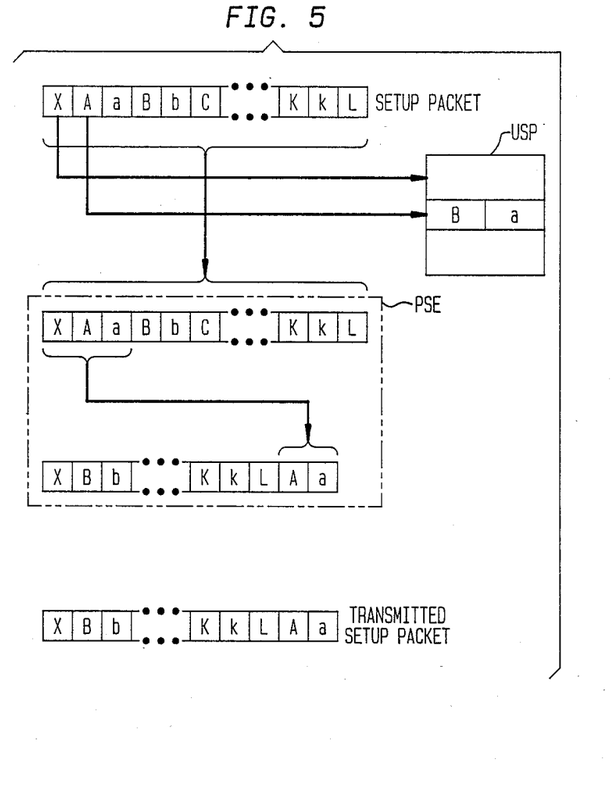

In a third method (FIG. 5), the central control device ZSE transmits a setup packet, whose header contains a predetermined virtual channel number X for the identification of the setup packet. The information part of this setup packet contains in successive pairs of octets for each of the switching matrices a virtual channel number to be used on the input side and the address information designating the output to be used. When this setup packet passes through the switching matrix, the respective memory system USP is activated by the virtual channel number entered in the first pair of octets of the information part, and the address information contained in this pair of octets, as well as the virtual channel number contained in the following pair of octets, is stored. For the transmission of the setup packet to the following switching matrix, the pair of octets following the packet header is removed and, if desired, added to the end of the setup packet.

The third method can always be used when, as a result of the predetermined structure, there are no control bits available for the packets to be transmitted over the switching system shown in FIG. 1 that can be used to indicate a setup packet.

Finally, a fourth method provides that in a setup packet, as shown in FIG. 3, there is included in the control information additional information which is used to indicate whether or not, when a setup packet passes through the respective switching matrix, a write cycle is to be performed in the memory of system that matrix, and whether or not a virtual channel number and address information is also to be written into the activated memory cell in the course of a write cycle. This procedure makes it possible to establish virtual multi-point connections over the switching system shown in FIG. 1.

It is pointed out in addition that a marker is also transmitted in the setup packets described above. After a setup packet has completed its passage through the switching system shown in FIG. 1, this marker controls the interface system that is connected to the last switching matrix that has been traversed in such a manner that a retransmission of the setup packet in question to the transmission line connected to this interface circuit is prevented. Instead, the setup packet in question is sent back over the bus system L2 shown in FIG. 1 to the central control device ZSE, in order to indicate to it that the setup packet has completed its passage through the switching system.

Figure 6:
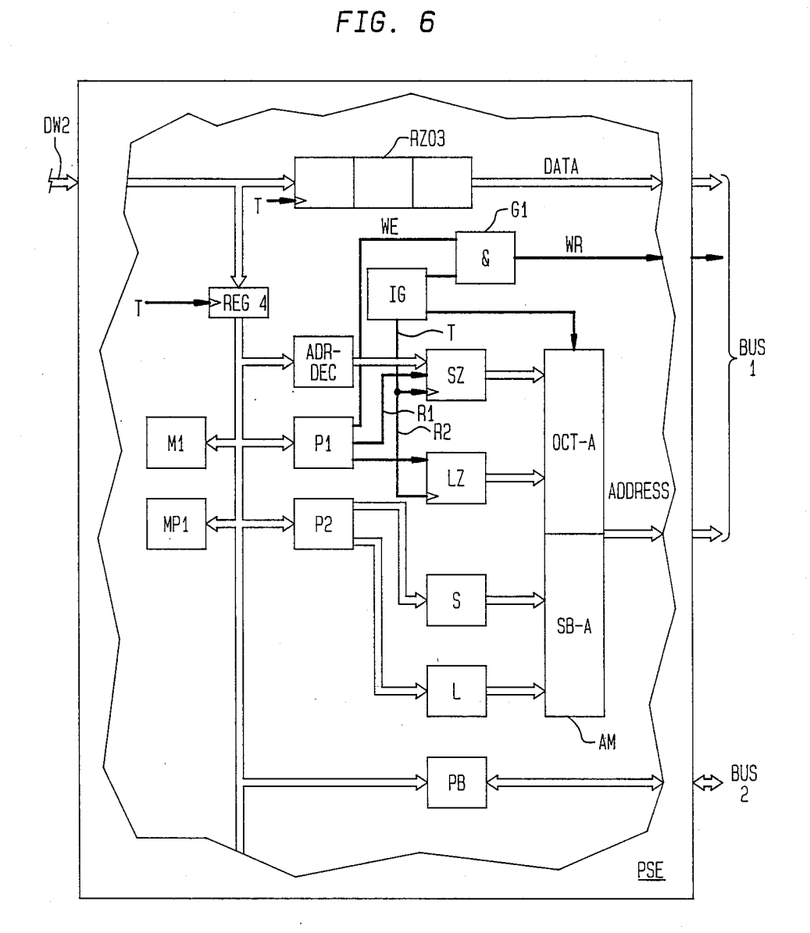
FIG. 6 shows a block diagram of a possible design of a packet control device PSE shown schematically in FIG. 2.

FIG. 6 shows a section of a possible design for the packet control device PSE that is included in each of the input control devices ESE1 to ESE8 (FIG. 2). In this case it is assumed for purposes of illustration that setup packets in the form shown in FIG. 3 are transmitted by the central control device ZSE.

According to FIG. 6, the packet control device consists of a microprocessor system. This serves on the one hand to exchange control information with the switching matrix control device KST shown in FIG. 2 and on the other to control the buffer memory PS shown in FIG. 2, which might consist of an RAM, in which packets can be arbitrarily stored in free storage areas and from which packets can be read out in the order in which they were received. This microprocessor system has a microprocessor MP1, to whose bus system are connected a memory system M1 which serves as a main memory and a program memory, a register Reg4, interface systems P1 to P3 and an address decoder ADR-DEC. The register Reg4 is connected on the input side to the output of the data selector DW2 shown in FIG. 2. It serves in this case for the intermediate storage of the control octets transmitted in the first pair of octets (packet header) in a setup packet or a message packet, which, as explained above, contains control information and address information (designated in FIG. 3 as SI and a to k, respectively). In addition, a multi-stage register Reg3 is connected to the data selector DW2 (of FIG. 2). This register prevents incoming setup packets and/or message packets from being transmitted to the buffer memory PS until the above-mentioned control octet is received in the register Reg4. For this purpose, the two registers are fed time pulses T from a pulse generator IG, spaced at intervals that correspond to the time between two successive octets.

Address information received in the register Reg4 is fed under the control of the microprocessor MP1 through the interface system P3 and the bus system BUS2 connected with it to the switching matrix control device KSE shown in FIG. 2. In addition, when a control octet is received the microprocessor sets up an address generator, which feeds to the buffer memory PS address signals and write pulses for write and read procedures over the bus system BUS1. The input of this address generator is formed by the interface systems P1 and P2 and the address decoder ADR-DEC.

In the direction of the buffer memory PS, the address generator has an address multiplexer AM, which is divided into two areas, SB-A and OCT-A. Connected to the area SB-A are a register S for the storage of a storage area address to be used in write procedures and a register L for the storage of a storage area address to be used in read procedures. These registers are connected on their input side with the interface system P2 mentioned above. Connected to the area OCT-A, on the other hand, are an octet counter SZ for write procedures and an octet counter LZ for read procedures. Each of these octet counters has a counting period corresponding to the number of octets contained in a packet and are driven for this purpose by the pulse generator IG mentioned above, through the emission of time pulses T. In addition, the pulse generator feeds setup signals (setup pulses) to the address multiplexer AM in the course of a control cycle.

The two octet counters SZ and LZ are connected through the respective resetting lines R1 and R2 with the interface system P1. A load input of the octet counter SZ is also connected to the address decoder ADR-DEC.

In addition, release signals for write procedures are fed from the interface system P1 over a control line WE to an AND gate G1. With the aid of this AND gate, a write pulse generated by the pulse generator IG is transmitted over a line WR whenever a release signal is received. This line is a part of the bus system BUS1 that leads to the buffer memory PS.

The setting of the address generator described above takes place in such a manner that when one of the control octets mentioned above is received in the register Reg4, the microprocessor MP1 first determines, on the basis of an availability list kept in the memory system M1, a free storage area for the buffer memory PS, in which the setup packet or message packet that has just been received can be stored. The initial address of this storage area is transferred through the interface system P2 into the register S. In addition, the octet counter SZ is preset, on the basis of the control information contained in the control octet, to an initial counter position that is explained below. In the course of a control cycle, the microprocessor then gives, in accordance with this setting, a number of release signals, corresponding to the number of octets contained in a packet, over the line WE. By means of these release signals, the control cycle is divided into a corresponding number of subcycles, in each of which a write pulse is fed to the buffer memory PS. Together with these write pulses, the buffer memory receives, through the address multiplexer AM, address signals determined by the register S and the counter position of the octet counter SZ. In the process, this counter position is incremented in each subcycle. In this manner, the octets of a setup packet or message packet that pass through the register Reg3 are stored in succession in the buffer memory PS.

The control cycle described above is, in addition, determined in such a manner that in each subcycle there can also be read out an octet of a packet which is stored in the buffer memory PS and is next in line for transmission. For this readout, a corresponding storage area address has been loaded in the register L from the microprocessor MP1. This loading takes place, furthermore, in response to a control signal transmitted by the switching matrix control device KST over the bus system BUS2. In addition, the microprocessor resets the octet counter LZ at the beginning of a control cycle, so that the counter assumes its initial counting position "zero". Starting from this initial counting position, the current counter position is then incremented in each subcycle. In this case, the alternation between a write procedure and a read procedure within a subcycle takes pace with the aid of a setup signal fed to the address multiplexer AM mentioned above.

As it has already been seen, the presetting of the octet counter SZ takes place in accordance with the control octet that has already been stored in the register Reg4. If this octet indicates the presence of a setup packet, then the octet counter is preset by the address decoder ADR-DEC in such a manner that the first two octets of the setup packet are stored in the course of a control cycle in the last two memory cells of the selected storage area. The following octets are then stored in the remaining memory cells of this storage area in the order in which they were received, beginning with the first storage cell. This means, for example, that in the case of a setup packet comprising 32 octets, address signals in the sequence 30, 31, 0, . . . , 29 are fed to the buffer memory PS in the course of a control cycle. Since, as has already been explained, for the readout of a packet from the buffer memory PS, address signals in the sequence 0, 1, . . . are provided, a setup packet is thus rearranged under the control of the packet control device PSE in such a manner that when it is transmitted according to FIG. 3, what was formerly the first pair of octets is moved to the end of the setup packet in question.

On the other hand, if the presence of a message packet is indicated by a control octet stored in the register Reg4, the octet counter SZ is reset through the line R1 to its initial counting position "0," so that address signals in the sequence 0, 1, . . . are fed to the buffer memory PS in the course of a control cycle. Thus, the individual octets of a message packet are stored in the same sequence in which they are subsequently read out, so that upon transmission the sequence of the individual octets is preserved.

Figure 7:
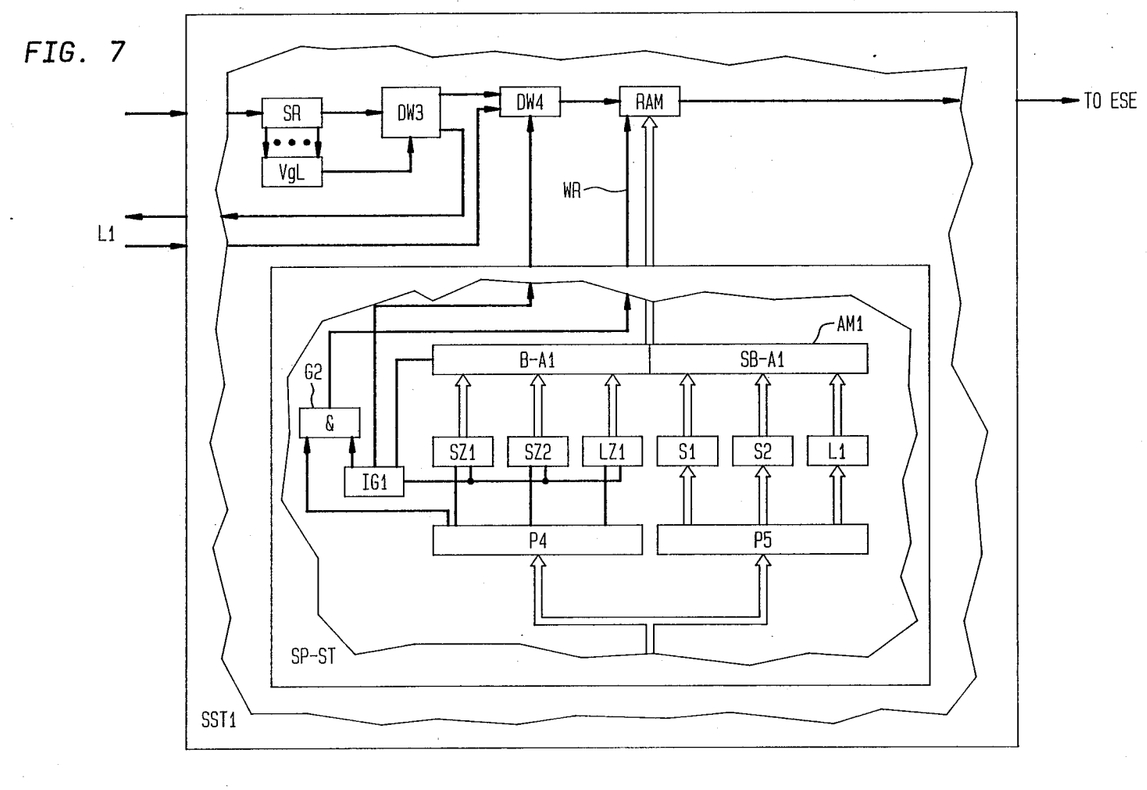
FIG. 7 shows a block diagram of a possible design of a interface systems SSTI shown schematically in FIG. 1.

FIG. 7 is a section of the network showing a possible design for the interface system SSTI shown in FIG. 1. According to it, incoming packets first pass through a shift register SR, which is connected on the output side with a data selector DW3. Connected to parallel outputs of this shift register is a comparator system Vg1, which monitors the arrival of a call packet on the basis of the predetermined virtual channel number contained in the packet. When such a call packet arrives, the comparator systems drives the data selector DW3 in such a manner that the call packet in question is fed over the bus system L1 to the central control device ZSE shown in FIG. 1. Packets of a different kind are fed, on the other hand, through the data selector to a first input of another data selector DW4. A second input is connected to the bus system L1, in order to transmit setup packets transferred from the central control device ZSE. The output of this data selector DW4 is connected with a data input of a write-read memory RAM, in which a large number of setup packets and message packets can be arbitrarily stored in free storage areas. The readout of stored packets and, accordingly, their transmission to the related input control devices (ESE1 to ESE8) takes place in the sequence in which these packets were stored (FIFO principle).

Connected to the write-read memory RAM is a memory-control device SP-ST, which has an address generator which might, for example, be controlled by a microprocessor (not shown here). The generator represents an address multiplexer AMI, which is divided into two areas SB-AI and B-Al. Connected to the area SB-Al are a register Ll for the storage of a storage area address to be used in read procedures and two registers S1 and S2 each for the storage of a storage area address to be used for write procedures. These registers are connected on the input side with an interface system P5. Connected to the area B-Al, on the other hand, are a bit counter LZ1 for read procedures and two bit counters SZ1 and SZ2 for write procedures. These bit counters each have a counting period corresponding to the number of bits contained in a packet. For this purpose, they receive corresponding time pulses fed from a pulse generator IG1. In addition, this pulse generator generates, on the one hand, setup signals for the address multiplexer AMI and the data selector DW4 and, on the other, write pulses. The release of these write pulses is accomplished with the aid of an AND element G2, which receives release signals fed over an interface system P4. Also connected to this system are reset inputs of the bit counters LZ1, SZ1 and SZ2.

The microprocessor belonging to the memory-control device SP-ST presets the address generator described above for the storage of a message packet or setup packet in the write-read memory RAM, on the basis of a current availability list. For this purpose an initial address for a free storage area is entered in the register S1 through the interface system P5, in which area the next incoming message packet can be stored. For any setup packet that it may be desirable to store together with a message packet, an initial address of a second storage area is also loaded into the register S2. In addition, upon the arrival of a message packet or a setup packet the free-wheeling bit counter SZ1 belonging to the register S1 or the free-wheeling bit counter SZ2 belonging to the register S2 is set back to its initial counting position. Such an arrival is indicated to the memory-control device SP-ST, for example, by the comparator system Vg1 or the central control system ZSE by means of a corresponding control signal. In the next control cycle, which is divided into a number of subcycles corresponding to the number of bits contained in a packet, two of the write pulses provided by the pulse generator IGI and released by release signals transmitted through the interface system P4 are then fed in each subcycle to the write-read memory RAM. In addition, in each subcycle, under the control of the pulse generator IG1, the data selector DW4 is switched and the bit counters SZ1 and SZ2 are incremented, so that in successive subcycles, the bits of a message packet and the bits of a setup packet can be read together, one after the other, into the write-read memory RAM.

In addition, the subcycles of a control cycle are determined in such a manner that in each one a bit of a packet stored in the write-read memory RAM can also be read out. For the readout of such a packet, at the beginning of a control cycle, according to an occupancy list, an appropriate initial address of a storage area occupied by a packet is loaded into the register L and the related bit counter LZ is set back to its initial counting position. On the basis of this initial counting position, there is a continuous incrementation of the current counter position in the successive subcycles.

Also connected downstream of the write-read memory RAM in the embodiment described here is a device, not shown here, corresponding to the shift register SR and the comparator system Vg1, in order to indicate to the data selector shown in FIG. 2 the beginning of the setup packet that has been read out.

The above description is only an example of the storage of a setup packet according to the first method, with modification of the sequence of the octets belonging to it. The packet control device shown in FIG. 6 can, however, also be easily adapted to setup packets of the other methods by an appropriate presetting of the respective address generator.

Figure 8:
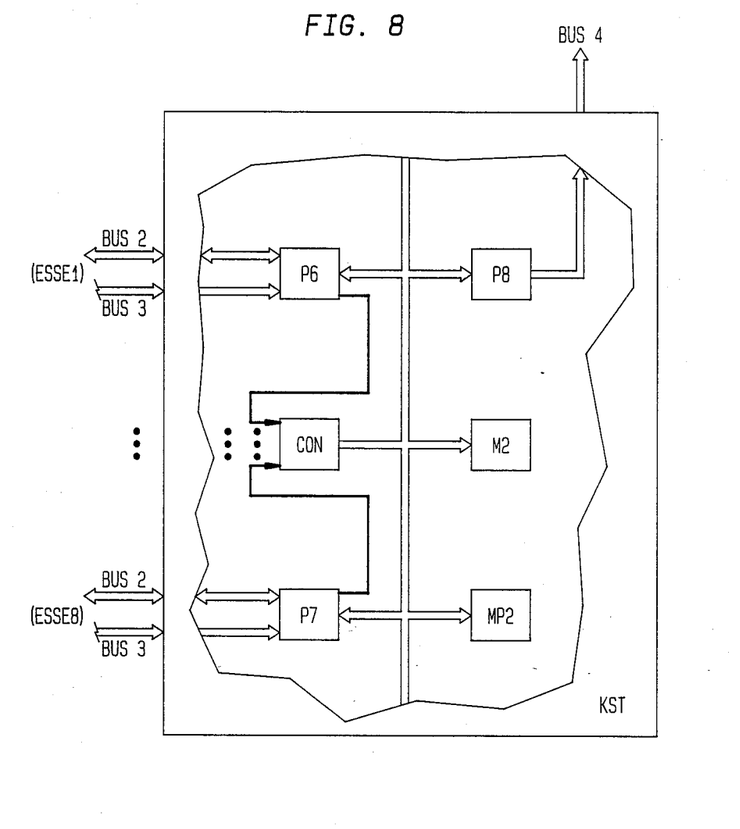
FIG. 8 shows a block diagram of a possible design of a switching matrix control device KST shown schematically in FIG. 2.

FIG. 8 shows a section of the network containing a possible design of the switching matrix control device KST shown in FIG. 2. According to it, this device has a microprocessor MP2, to whose bus system are connected a memory system M2 which serves as a main memory and a program memory, interface systems P6, P7 and P8, and an interrupt controller system Con. The interface systems P6 and P7 are intended to represent a total of 8 interface systems of the same kind, which are connected by the bus systems BUS2 and BUS3 to one of the input control devices ESE1 to ESE8 shown in FIG. 2. Each of these interface systems is connected over a control line to the above-mentioned interrupter-controller system Con. An interrupt signal is fed over a control line of this kind to the microprocessor MP2 whenever address information, as describe above is received by the respective interface system over one of the bus systems BUS2 or BUS3. In addition, the interface systems (P6, P7) serve for the transmission of the control signals mentioned above for controlling read procedures in the buffer memory PS. On the other hand, through the interface system P8, the microprocessor MP2 sets up the switching matrix shown in FIG. 2.

Figure 9:
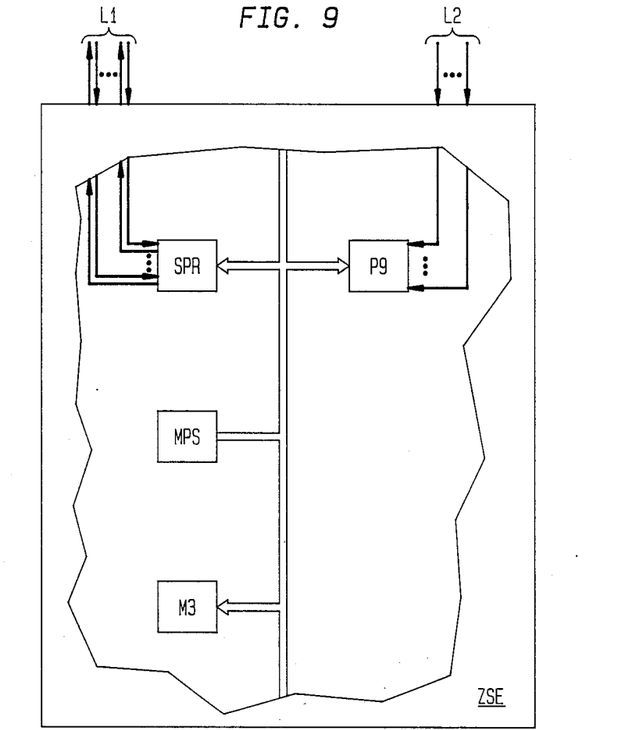
FIG. 9 shows a block diagram of a possible design of a central control device ZSE shown schematically in FIG. 1.

As already mentioned above, the central control device ZSE shown in FIG. 1 can take the form of a microprocessor system. A section of the network including a possible design is shown in FIG. 9. A memory system M3 is connected as a main memory and a program memory to the bus system of a microprocessor MP3. In addition, a signal processor SPR and an interface system P9 are connected to this bus system. Through the signal processor, the central control device ZSE is connected over the bus system L1 to the interface systems SST1 shown in FIG. 1. The signal processor SPR automatically performs the procedures that are required in connection with the arrival of call packets. It transmits only the destination addresses contained in these call packets to the microprocessor MP3. On the basis of such a destination address, the microprocessor determines, according to an availability list kept in the memory system M3, the switching matrices of the switching system shown in FIG. 1 that are involved in the respective connection to be established and, at the same time, determines the output to be used for each of these switching matrices and a virtual channel number to be used for that output. According to this determination, the microprocessor MP3 then composes a setup packet, using one of the methods described above, and transmits it over the bus system L1.

The bus system shown in FIG. 1 is connected to the interface system P9. Over this bus system, the central control device ZSE, as has already been explained, receives again setup packets transmitted over the switching system shown in FIG. 1.

There has thus been shown and described a novel process which fulfills al the objects and advantages sought therefor. Many changes, modifications, variations and other uses and applications of the subject invention will, however, become apparent to those skilled in the art after considering this specification and the accompanying drawing which disclose the preferred embodiments thereof. All such changes, modifications, variations and other uses and applications which do not depart from the spirit and scope of the invention are deemed to be covered by the invention which is limited only by the claims which follow.

We claim:

1. Process for the establishment of virtual connections passing through switching matrices of a multistage switching system for the transmission of message packets fed to inputs of the switching system whereby each of the message packets contains in a packet header a virtual channel number designating the respective virtual connection, and wherein a memory device is assigned to each of the inputs of each of the switching matrices, in which individual information is stored for the virtual connections passing through the assigned input, said process comprising the steps of:

inputting at one of the inputs of the switching system a call packet requesting the establishment of a virtual connection and containing, in addition to a virtual channel number designating the virtual connection, a destination address, determining by a central control device assigned to the switching system, the switching matrices to be used for the virtual connection in question, determining individual information for each of the switching matrices, emitting from the central control device to the switching system a specially indicated setup packet containing the individual information that has just been determined through the input at which the call packet in question had previously arrived, passing the setup packet through the switching matrices involved in the virtual connection that is to be established, pursuant to the individual information contained in the setup packet, taking off by each of the switching matrices the individual information intended for it, and storing the individual information in the respective memory device which individual information gives on the one hand, the output of the respective switching matrix through which the message packets belonging to the respective virtual connection are to be transmitted and, on the other hand contains a virtual channel number which is entered in the message packets belonging to the respective virtual connection for their transmission.

2. Process according to claim 1, wherein in the setup packet that is emitted by the central control device, information blocks assigned to the respective switching matrices included in the virtual connection to be established are transmitted in the sequence of the switching matrices to be traversed, wherein the first information block is the packet header of the setup packet, wherein each of these information blocks contains control information for the purpose of identifying a setup packet, a virtual channel number designating the respective virtual connection, and address information which designates the output of the respective switching matrix that is to be used for transmission, wherein in each of the switching matrices, upon the arrival of a setup packet through one of its inputs, pursuant to the virtual channel number and control information contained in the packet header, a memory cell, assigned to the virtual channel number in question, of the memory device belonging to the input in question is set for a write cycle in which the address information contained in the packet header and the virtual channel number contained in the information block following the packet header are stored in the memory cell that has just been set, and wherein the setup packet that was previously received, is transmitted, after removal of the first information block or after removal of the first information block and addition of the first information block at the end of the setup packet, through the output designated by the previously stored address information.

3. Process according to claim 1, wherein in the setup packet emitted by the central control device, there is transmitted a packet header containing a virtual channel number to be used to activate the first switching matrix and control information serving to identify a setup packet, and information blocks assigned to the switching matrices to be included in the virtual connection to be established, in the sequence of the switching matrices to be traversed, wherein each of the information blocks contains address information designating the output to be used in each case and a virtual channel number applicable to this output, wherein in each of the switching matrices, upon the arrival of a setup packet through one of the inputs pursuant to the virtual channel number contained in the packet header, a memory cell of the memory device belonging to the input in question is set for a write cycle in which the information contained in the information block following the packet header is stored in the memory cell that has just been set, and wherein, after removal of the former packet header and replacement of the address information contained in the information block following the header by the control information contained in the former packet header, the setup packet that had previously been received is transmitted through the output designated by the previously stored address information.

4. Process according to claim 1, wherein in the setup packet emitted by the central control device there is transmitted a packet header which contains a predetermined virtual channel number serving to identify a setup packet and information blocks assigned to the switching matrices to be included in the virtual connection to be established, in the sequence of the switching matrices to be traversed, wherein each of these information blocks contains a virtual channel number identifying the respective virtual connection and address information concerning the output of the respective switching matrix that is to be used for transmission, wherein in each of the switching matrices, upon the arrival of a setup packet through one of the inputs pursuant to the virtual channel number contained in the information block following the packet header, a memory cell of the memory device belonging to the input in question is set for a write cycle in which the address information contained in the information block in question and the virtual channel number contained in the information block following this information block are stored in the memory cell that has just been set, and wherein the setup packet that had previously been received is transmitted, after removal of the former first information block or addition the first information block to the end of the setup packet, through the output designated by the previously stored address information.

5. Process according to claim 2, wherein by means of the control information contained in each case in the information blocks of the setup packet, it is also indicated whether or not a write cycle is to be performed in the respective switching matrix when it is traversed by the setup packet in question and whether in the course of a write cycle a virtual channel number and address information are also to be written into the memory device in question.

* * * * *